(12) United States Patent
Smith (10) Patent No.: US 6,705,749 B1
(45) Date of Patent: Mar. 16, 2004

(54) LIGHT BEAM LOCATION ADJUSTMENT DEVICE AND METHOD

(75) Inventor: Kenneth Smith, Porum, OK (US)

(73) Assignee: Optronics, Inc., Muskogee, OK (US)

( * ) Notice: Subject to any disclaimer, the term of this patent is extended or adjusted under 35 U.S.C. 154(b) by 1 day.

(21) Appl. No.: 10/056,252

(22) Filed: Jan. 24, 2002

(51) Int. Cl.[7] ............................................. F21V 19/02
(52) U.S. Cl. ..................... 362/372; 362/285; 362/428
(58) Field of Search ................................ 362/190, 191, 362/197–199, 269, 271, 273, 275, 285, 287, 289, 372, 419, 427, 428, 514, 515, 523, 530

(56) References Cited

U.S. PATENT DOCUMENTS

| | | | | |
|---|---|---|---|---|
| 3,932,837 A | * | 1/1976 | Baker | 362/419 |
| 4,343,031 A | * | 8/1982 | Liebegott | 362/523 |
| 4,599,681 A | * | 7/1986 | McMahan et al. | 362/523 |
| 4,731,706 A | * | 3/1988 | Ricard | 362/463 |
| 5,077,641 A | * | 12/1991 | Schmidt et al. | 362/514 |
| 5,113,330 A | * | 5/1992 | Makita | 362/285 |
| 5,386,349 A | * | 1/1995 | Wheat et al. | 362/530 |
| 5,567,035 A | * | 10/1996 | Dobler et al. | 362/514 |
| 6,220,735 B1 | * | 4/2001 | Matubara | 362/523 |

FOREIGN PATENT DOCUMENTS

DE 3429040 A1 * 2/1986 ................. 362/515

* cited by examiner

Primary Examiner—Alan Cariaso
(74) Attorney, Agent, or Firm—Head, Johnson & Kachigian (57) ABSTRACT

A light beam location adjustment device. The device includes a bulb and a bulb holder and a pivot mount. A reflector is directly attached to the pivot mount. A first pivot mechanism is provided to pivot the pivot mount about a first axis. The first pivot mechanism includes a hinge at the first axis with the pivot mechanism moved by a first adjustment pin. A second pivot mechanism is provided to pivot the pivot mount about a second axis perpendicular to the first axis. The second pivot mechanism includes a pivot connected to the pivot mount which will rotate the pivot mount in response to movement of the pivot.

2 Claims, 9 Drawing Sheets

LIGHT BEAM LOCATION ADJUSTMENT DEVICE AND METHOD

BACKGROUND OF THE INVENTION

1. Field of the Invention

The present invention relates to a location adjustment device for a light beam. In particular, the present invention is directed to an adjustment device for a light beam for use in various types of lights including spotlights, flashlights and gun lights and to a method to adjust a light beam.

2. Prior Art

It is often desirable to adjust the light beam location regarding various types of lights including spotlights, flashlights and gun lights.

In the past, adjustments have been provided in lights to the bulb and/or to the bulb holder by moving the bulb axially with respect to the reflector.

There remains a need to provide a light allowing adjustments of the reflector to various positions. While axial movement of the reflector is desirable, a movement mechanism which will provide for a full range of movement of the reflector is more desirable.

Accordingly, it is a principal object and purpose of the present invention to provide a location adjustment device for a light beam for a lighting device which will provide adjustment of the reflector to a wide range of positions.

It is a further object and purpose of the present invention to provide both horizontal and vertical adjustment of the beam of the light in order to align the light when used with a scope, such as a gun scope.

In the past, a beam larger than required was employed to compensate for any misalignment. Concern about misalignment would be avoided if the beam of light is large enough to compensate. It is a further object and purpose of the present invention to provide an adjustment device so that a smaller beam may be employed than would otherwise be required.

Additionally, in the past, at least one prior device permitted adjustment of the light beam location using various tools. It would be advantageous to provide a light beam location adjustment device and method wherein no tools are required for adjustment. Accordingly, it is a further object and purpose of the present invention to allow adjustment of the projected beam so that the light is aligned with a simple turn of either of two knobs.

It is a further object and purpose of the present invention to provide an adjustment device wherein the adjustment motion is controlled by two independent axes for separate motion.

It is a further object and purpose of the invention to provide a light beam location adjustment device with the ability to make necessary light adjustments while the light is in use without access to the internal elements of the light fixture.

SUMMARY OF THE INVENTION

The present invention is directed to an adjustment device and method for a light beam on a light such as a spotlight or gun light. The light device may include a front and back housing and a bracket for mounting the device.

A reflector has an opening at its center with an extending cylinder extending therefrom. A light bulb is held in place by a bulb holder. A pair of wires extending from the bulb holder will be connected to a power source.

The extending cylinder of the reflector rests in a recess in a pivot mount. The reflector is directly connected to the pivot mount by fasteners received through openings in the pivot mount.

The pivot mount is permitted and allowed to move within and with respect to the front and back housing. The pivot mount will he permitted to move and rotate about a first axis which passes through a hinge including a yoke extending from the pivot mount. Opposed to the hinge and to the yoke is an extension extending from an opposed side of the pivot mount. The extension includes an opening in which is inserted an end of a first adjustment pin. The first adjustment pin may be moved axially. One end of the pin terminates in an externally threaded end which is received in a knob having internal threads. The opposite end of the pin includes an opening. A fastener is received through the pin opening and through an opening in the extension of the pivot mount so that axial movement of the first adjustment pin translates into movement of the pivot mount about the first axis.

The pivot mount will, in addition, be permitted to move and rotate about a second axis. The second axis passes through the pivot mount and also passes through a pivot member. The pivot member includes a hinge leaf which fits within the yoke of the pivot member. Opposed to the hinge leaf on the pivot mount is a cylindrical post. The second axis passes through and is coaxial with the cylindrical post, which is permitted to rotate in a recess in the back housing.

The pivot member is moved by a second adjustment pin which may be moved axially. The second adjustment pin terminates on one end with external threads which are received by a knob having internal threads. Each of the knobs is snap-fit in place to the back housing so that the knob is permitted to rotate but is not allowed to move axially. Accordingly, rotation of the knob will produce axial movement of the second adjustment pin.

The second adjustment pin terminates on an end opposed to the threaded end in a projection having an opening therethrough which receives the pivot member therein. Accordingly, movement of the second adjustment pin results in rotational movement of the pivot member. In turn, rotational movement of the pivot member rotates the pivot mount.

Accordingly, the present invention provides a mechanism to adjust a light beam about a first axis and about a second axis perpendicular to the first axis.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
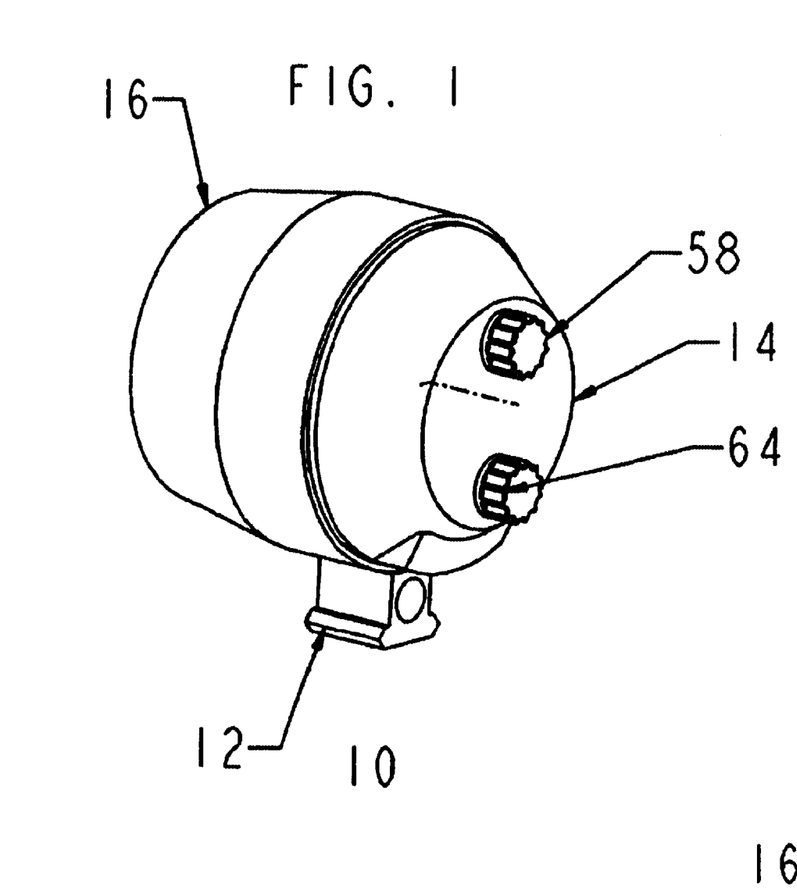
FIG. 1 is a perspective view and FIG. 2 is a side view of a light device incorporating a light beam location adjustment device in accordance with the present invention.
Figure 2:
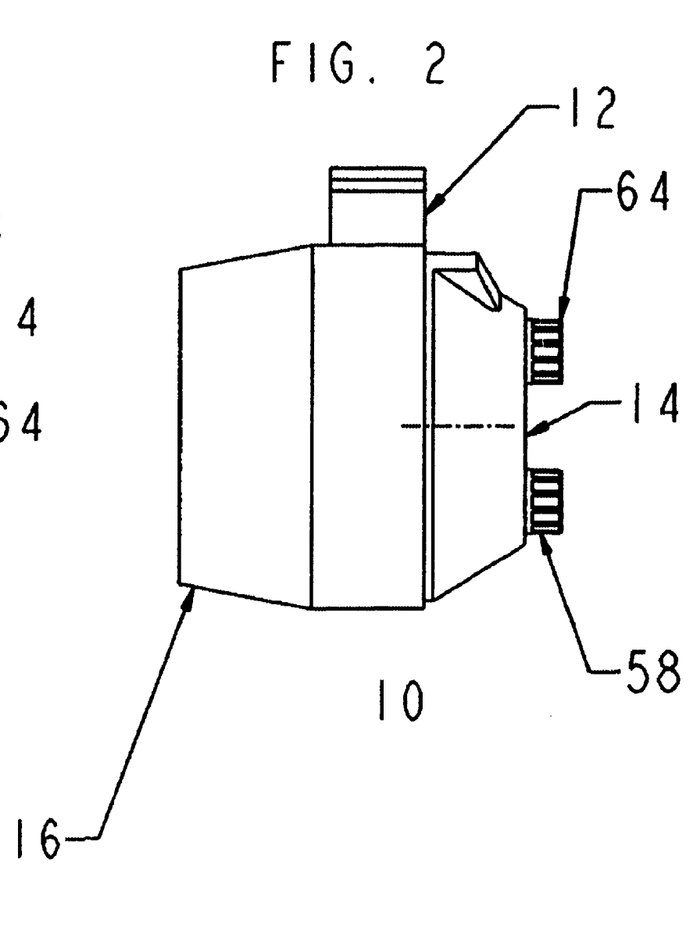

Referring to the drawings in detail, FIG. 1 shows a perspective view and FIG. 2 shows a side view of a light device 10 incorporating the teachings of the present invention. The embodiment shown in FIGS. 1 and 2 is specifically for a gun light although it will be understood that the teachings of the present invention apply broadly to various types of lights including spotlights, flashlights and other types of lighting fixtures where it is desirable to accurately locate the light beam.

The light device 10 may include a bracket 12 for mounting a light device such as a mount for a gun light. The light device 10 includes a back housing 14 which mates with a front housing 16. The bracket might be secured by fasteners so that the back and front housing are stationery. The front housing 16 may be designed to retain a lens (not visible in FIGS. 1 and 2), such as a clear or colored lens.

The back housing 14 may be snap fit to the front housing. Alternately, the back housing might be connected to the front housing by adhesives or fasteners. The back housing in the present embodiment is generally frustoconical. It will be understood that the back housing and the front housing may take various configurations within the teachings of the present invention. The light device 10 also includes a first rotatable knob and a second rotatable knob which will be described in detail herein.

Figure 3:
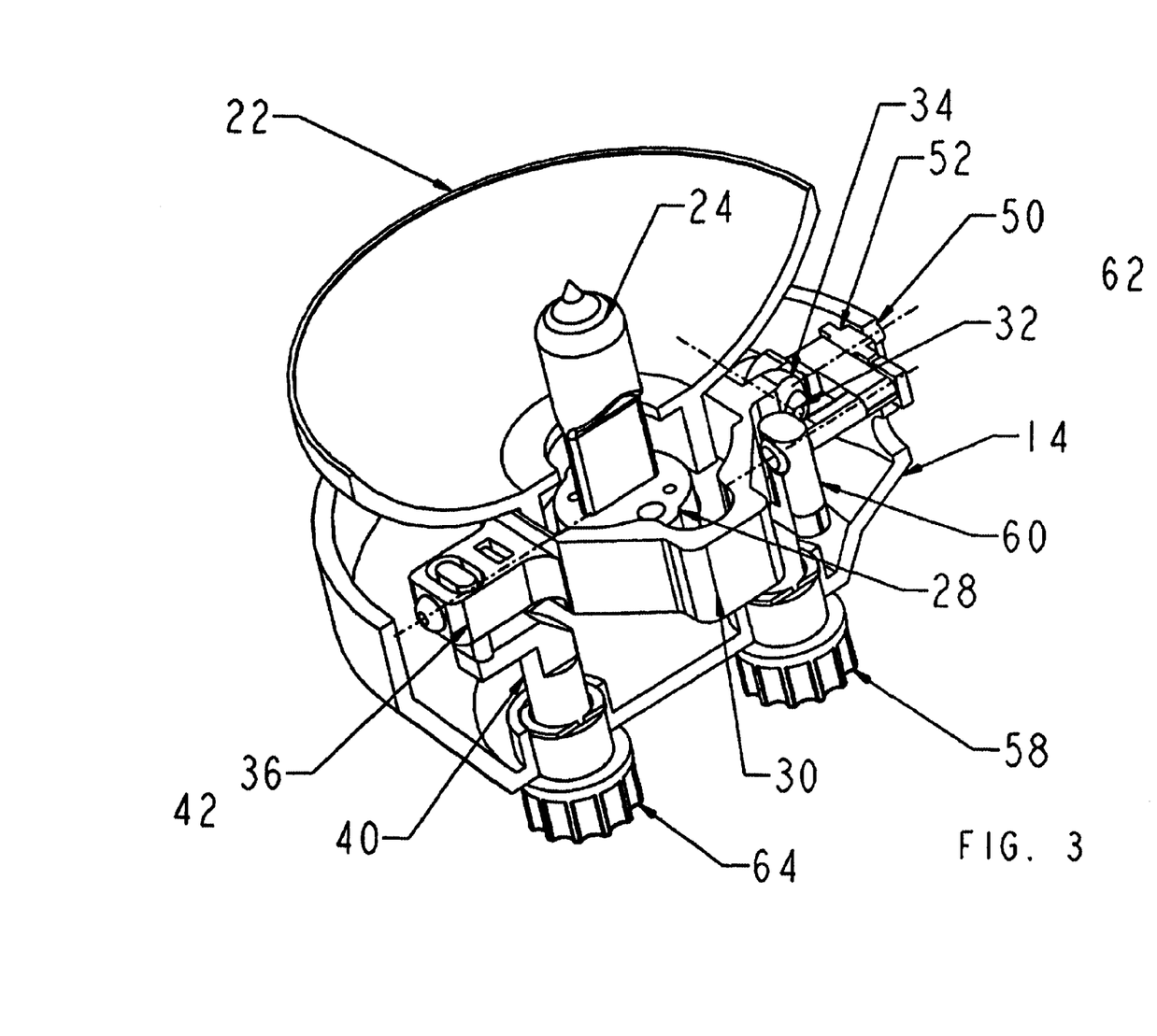
FIG. 3 is an alternate perspective view of the light device shown in FIGS. 1 and 2 with portions cut away and removed for ease of viewing.

FIG. 3 is a perspective view of the light device 10 shown in FIGS. 1 and 2 with portions cut away and removed for ease of viewing. The front housing 16 has been completely removed and the back housing 14 has been partially cut away.

A reflector 22 is shown partially cut away. The reflector 22 has an opening at its center with an extending cylinder 26. A light source such as a light bulb 24 is held in place by a bulb holder 28. Light from the bulb 24 is thus reflected and projected from the reflector 22.

The bulb 24 in the present embodiment terminates in a pair of prongs which are received in the holder 28, however, other types of bulbs may be used within the scope of the present invention. Extending from the bulb holder 28 will be a pair of wires connected to a power source such as a battery (not shown). In the present embodiment, the battery or batteries (not shown) are external to the device 10. Alternately, the wires may be connected to an alternate power source.

The extending cylinder 26 of the reflector rests in a recess in a pivot mount 30. The reflector 22 is directly connected to a pivot mount 30 by fasteners received through openings 38 in the pivot mount 30 (not visible in FIG. 3).

As will be described herein, the pivot mount 30 is permitted and allowed to move within and with respect to the front and back housing. The pivot mount 30 is smaller than the diameter of the back housing 14 so that it fits therein. Most importantly, movement of the pivot mount 30 translates directly into movement of the reflector 22 and the bulb holder.

Figure 4:
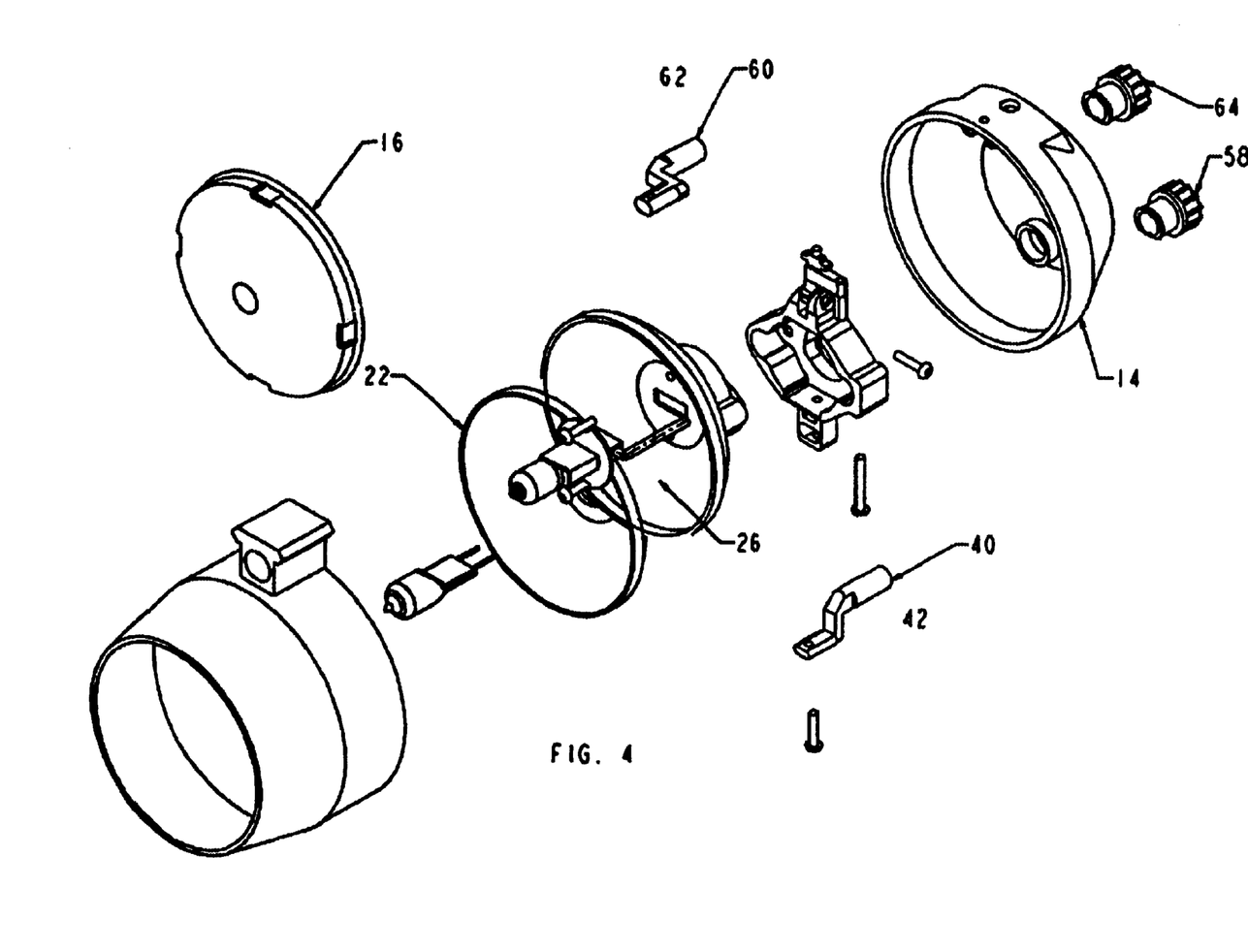
FIG. 4 illustrates an exploded view of the light device incorporating the light beam location adjustment device shown in FIGS. 1, 2 and 3.

With reference to an exploded view of the device 10 shown in FIG. 4 and with continuing reference to FIG. 3, a first pivot mechanism is provided to pivot the pivot mount 30. The pivot mount 30 will be permitted to move and rotate about a first axis 32 shown in dashed lines in FIG. 3.

The first axis 32 passes through a hinge which includes a yoke 34 extending from the pivot mount 30. Opposed to the hinge and to the yoke 34 is an extension 36 extending from an opposed side of the pivot mount 30. The extension 36 includes an opening in which is inserted an end of a first adjustment pin 40. The first adjustment pin 40 may be moved axially as illustrated by arrow 42.

Figure 5:
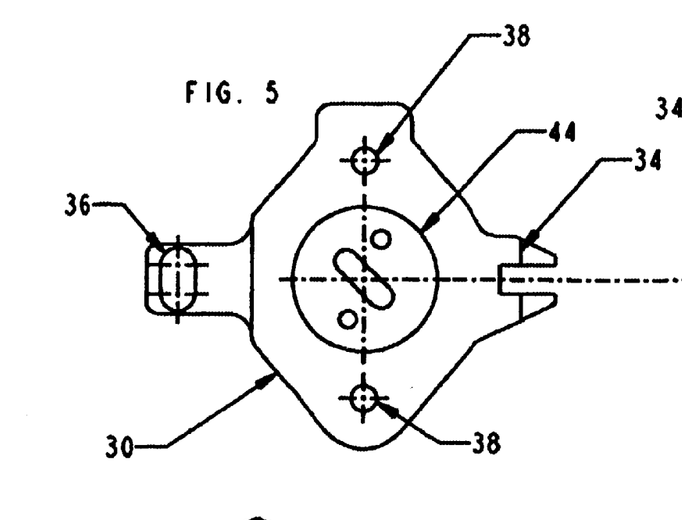
FIGS. 5, 6, and 7 show views of a pivot mount of the light beam location adjustment apart from the rest of the device.
Figure 6:
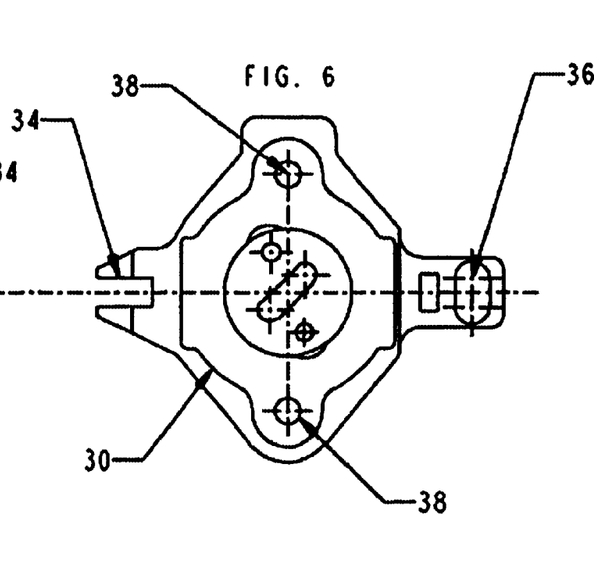
Figure 7:
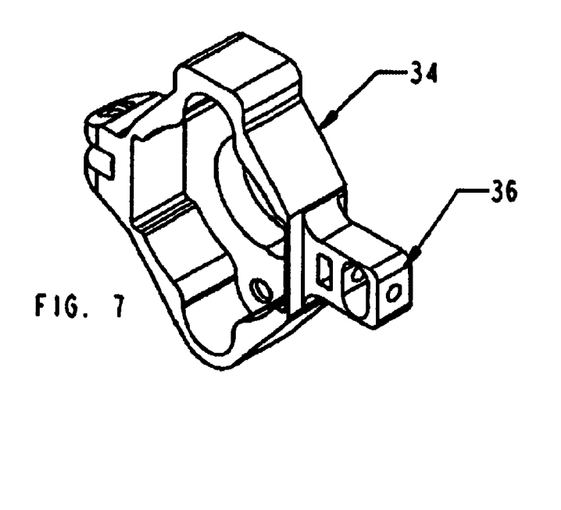

FIGS. 5, 6 and 7 illustrate the pivot mount 30 apart from the device 10. FIG. 5 illustrates a top view. FIG. 6 illustrates a bottom view, and FIG. 7 illustrates a perspective view apart from the device. The yoke 34 is opposed to and on the opposite side of the extension 36. The center of the pivot mount includes a recess 44 in which the bulb holder 28 will be received and fastened thereto by fasteners.

Figure 8:
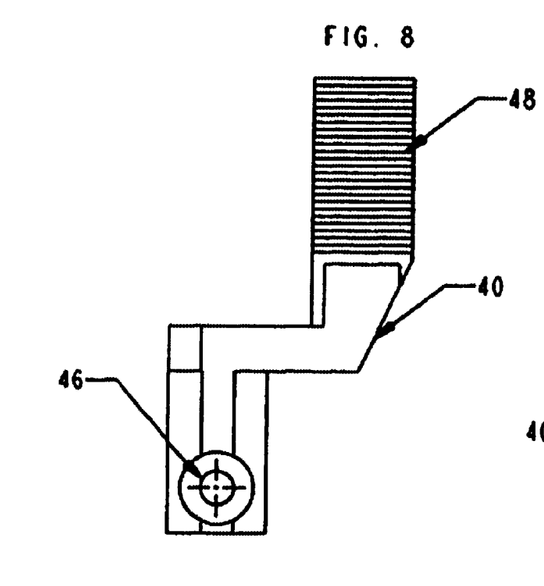
FIGS. 8, 9, 10 and 11 show views of a first adjustment pin of the light beam location adjustment device of the present invention.
Figure 9:
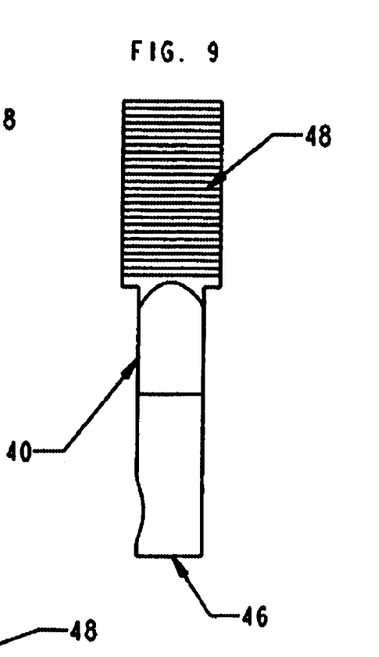
Figure 10:
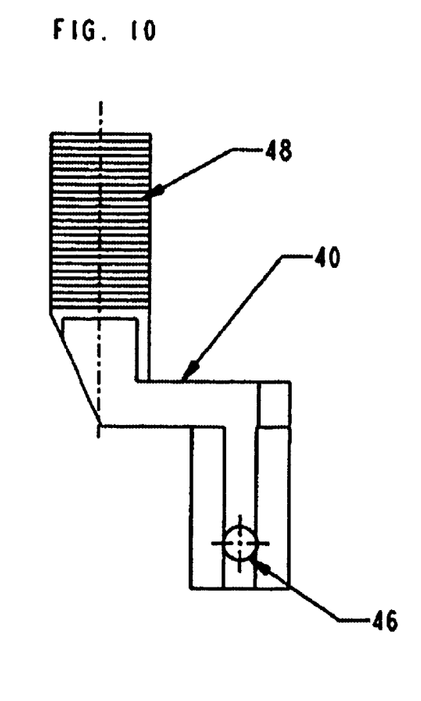
Figure 11:
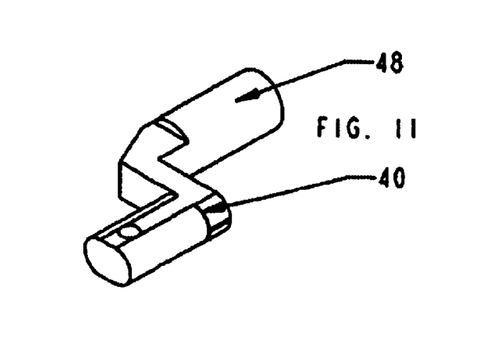

FIGS. 8, 9, 10 and 11 illustrate the first adjustment pin 40 apart from the device 10. FIGS. 8 and 10 illustrate side views and FIG. 9 illustrates a front view of the pin. FIG. 11 illustrates a perspective view of the pin 40. One end of the pin 40 terminates in an eternally threaded end 48. The end 48 will be received in a knob 64 having internal threads (see FIG. 3). The opposite end of the pin 40 includes an opening 46 therethrough. A fastener is received through the pin opening and through an opening in the extension 36 of the pivot mount 30 so that axial movement of the pin 40 translates into movement of the pivot mount 30 about the first axis.

Figure 12:
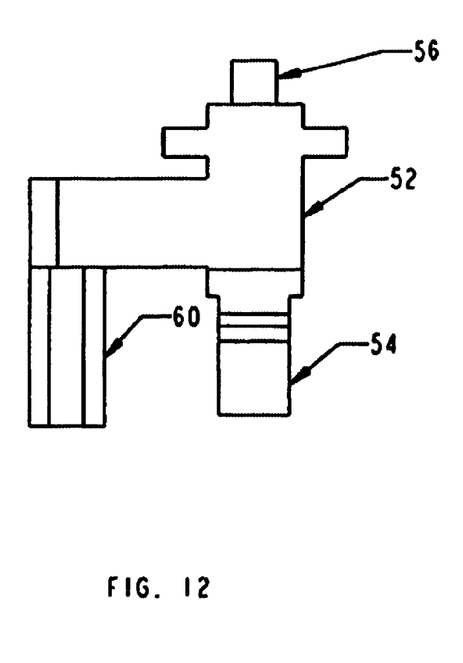
FIGS. 12, 13, 14 and 15 illustrate a pivot element apart from the light beam location adjustment device of the present invention.
Figure 13:
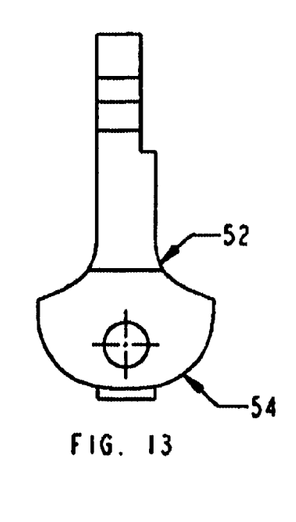
Figure 14:
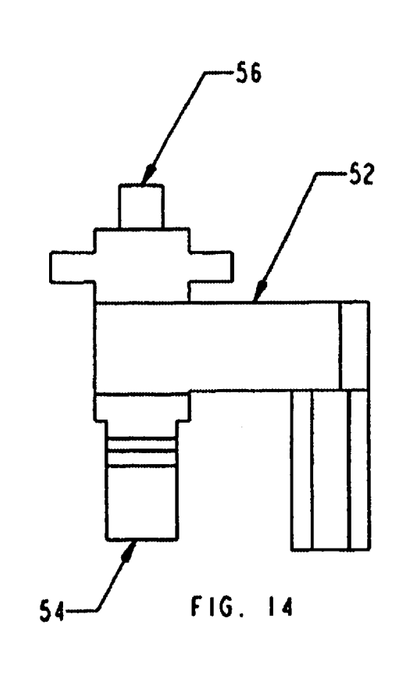
Figure 15:
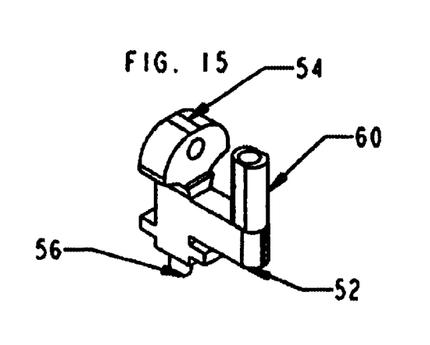
Figure 16:
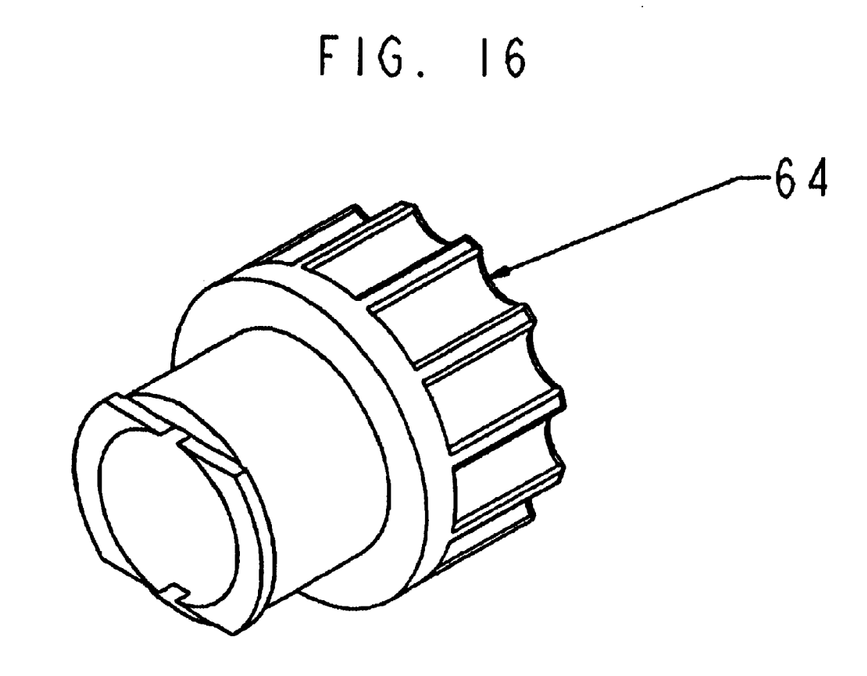
FIG. 16 illustrates one of the two adjustment knobs of the light beam location adjustment device of the present invention.
Figure 17:
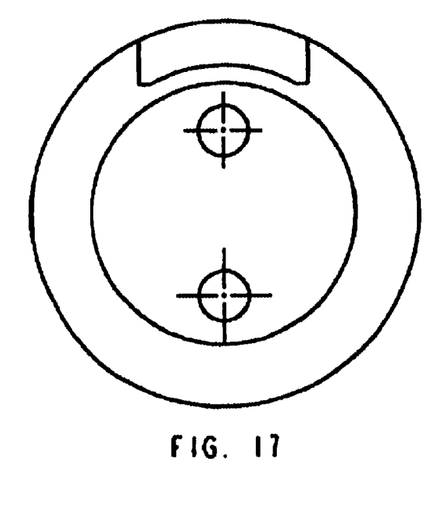
FIGS. 17, 18, 19 and 20 shows alternate views of a back housing of the light beam location device of the present invention.
Figure 18:
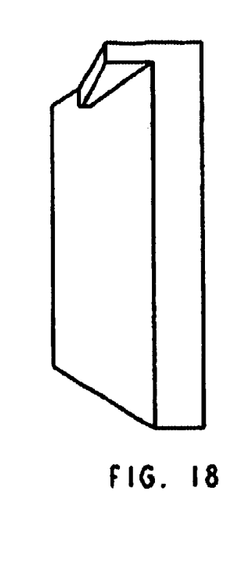
Figure 19:
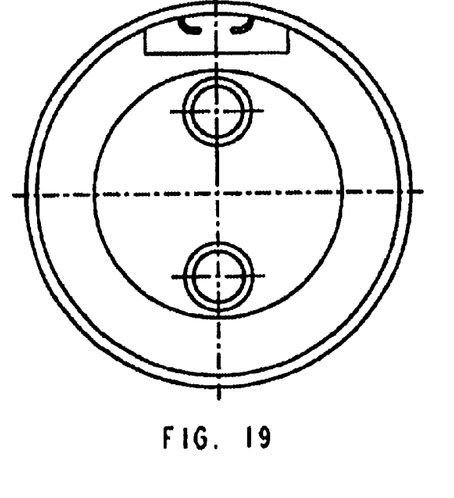
Figure 20:
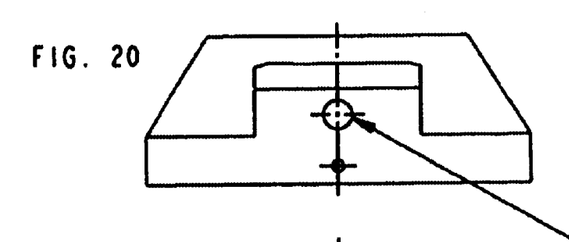
Figure 21:
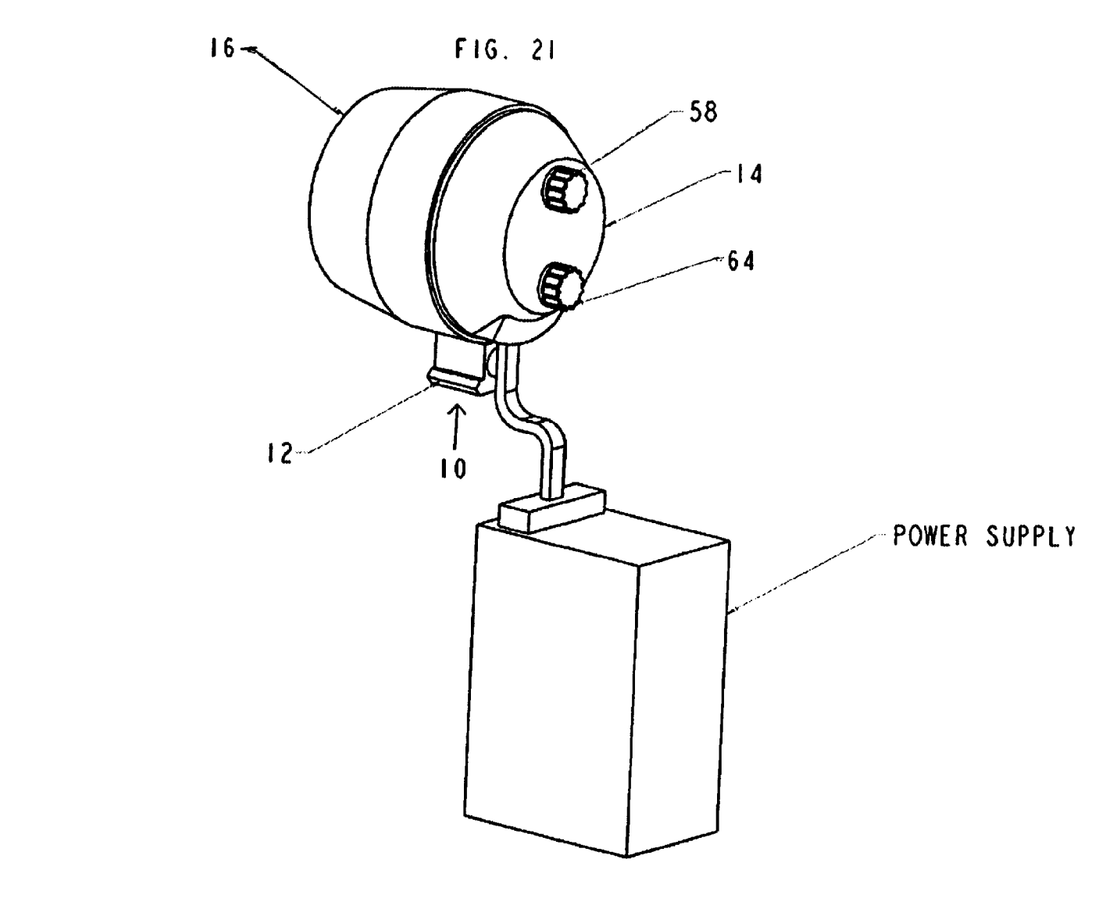
FIG. 21 is a perspective view of a light device incorporating a light beam location adjustment device with an external power supply.

The pivot mount 30 will in addition, be permitted to move and rotate about a second axis 50 shown in dashed lines in FIG. 3. The second axis 50 passes through the pivot mount 30 and also passes through a pivot member 52. The pivot member 52 is shown apart from the light device 10 in FIGS. 12, 13, 14 and 15. FIGS. 12 and 14 are alternate side views. FIG. 13 is a rear view and FIG. 15 is a perspective view of the pivot member 52. The second axis 50 is perpendicular to the first axis 32. The pivot member 52 includes an extending hinge leaf 54 which fits within the yoke 34 of the pivot member 52.

Opposed to the hinge leaf 54 in the pivot mount 30 is a cylindrical post 56. The second axis 50 passes through and is coaxial with the cylindrical post 56.

The pivot member 52 is moved by a second adjustment pin 60 which is also seen in FIGS. 3 and 4. The second adjustment pin is moved axially as illustrated by arrow 62.

The second adjustment pin 60 terminates on one end with external threads which are received by a knob 58 having internal threads. Each of the knobs 58 or 64 is snap fit in place to receptacles in the back housing 14. The back housing is seen apart from the device in FIGS. 17, 18, 19 and 20. The knobs 58 and 64 is permitted to rotate but not allowed to move axially. Accordingly, rotation of the knob 58 will produce axial movement of the second adjustment pin 60. The second adjustment pin 60 terminates on the end opposed to the threaded end in a projection having an opening therethrough which receives the pivot member 54 therein. Accordingly, movement of the second adjustment pin 60 results in rotational movement of the pivot member. In turn, rotational movement of the pivot member rotates the pivot mount 30 which provides rotational movement to the reflector 22 and the bulb holder.

The cylindrical post 56 of the pivot member 52 rotates in a recess 70 in the back housing seen in FIGS. 17, 18, 19 and 20.

Accordingly, the present invention provides a mechanism to adjust a light beam to multiple positions. The pivot mount and accompanying reflector are, thus, pivoted about the first axis 32 by rotation of the first knob. The pivot mount and accompanying reflector are, thus, pivoted about the second axis 50 by rotation of the second knob 64.

It will be observed that the first axis 32 is perpendicular to the second axis 50 so that by movement of either knob 58 or 64 or both, a full range of positions of the light beam may be accomplished.

Whereas, the present invention has been described in relation to the drawings attached hereto, it should be understood that other and further modifications, apart from those shown or suggested herein, may be made within the spirit and scope of this invention.

What is claimed is:

1. A mountable light device comprising:

a front housing having a front and a back, said front comprising a lens and the back adapted to be attachable to a back housing;

a back housing having a front and a back, the front being adapted to attach to the front housing, and the back having two annular flanges extending towards the interior of the housing adapted to receive rotatable knobs, and the front housing and the back housing attached to form an interior compartment;

a first rotatable knob attached to one of the flanges of the back housing;

a second rotatable knob attached to one of the flanges of the back housing;

a mounting bracket extending outwardly from one of the front housing and adapted for attachment to another object;

a pivot mount having a reflector and a light bulb holder rigidly attached to the pivot mount such that the reflector and the light bulb holder project light in a light emanating direction when a light bulb is placed in the light bulb holder and power is supplied, and wherein the pivot mount has a pivot region and a pin attachment region opposite the pivot region;

a pivot mechanism rotatably attached to the back housing rotatable about a first axis and having the pivot mechanism attachment means adapted to provide pivotal attachment to the pivoting mount such that the pivoting mount may rotate on a second axis that is perpendicular to the first axis, wherein both the first axis and the second axis are perpendicular to the light emanating direction;

a first pivot pin attached to the pivot mechanism and to the first rotatable knob attached to the exterior of the back housing such that when the knob is rotated, the pin actuates the pivoting mechanism to as to cause rotation about the first axis; and a second pivot pin attached to the pin attachment region of the pivot mount and to the second knob attached to the exterior of the back housing such that when the second knob is rotated, the second pivot pin actuates the pivot mount to rotate about the second axis.

2. The mountable light device of claim 1 wherein a power supply is located exterior to the front housing and back housing.

\* \* \* \* \*

UNITED STATES PATENT AND TRADEMARK OFFICE
CERTIFICATE OF CORRECTION

PATENT NO. : 6,705,749 B1
DATED : March 16, 2004
INVENTOR(S) : Kenneth Smith It is certified that error appears in the above-identified patent and that said Letters Patent is hereby corrected as shown below:

Column 6,
Line 17, delete "attachment means"

Signed and Sealed this

Eighth Day of March, 2005

JON W. DUDAS
*Director of the United States Patent and Trademark Office*